Z. B. SHANNON.
Churn.

No. 59,282. Patented Oct. 30, 1866.

WITNESSES

INVENTOR

UNITED STATES PATENT OFFICE.

ZACCHEUS B. SHANNON, OF PORT WASHINGTON, OHIO.

IMPROVEMENT IN CHURNS.

Specification forming part of Letters Patent No. 59,282, dated October 30, 1866.

*To all whom it may concern:*

Be it known that I, ZACCHEUS B. SHANNON, of Port Washington, county of Tuscarawas, in the State of Ohio, have invented certain new and useful Improvements in Churns; and I do hereby declare that the following is a full, clear, and exact description of the same, reference being had to the accompanying drawings, and to the letters of reference marked thereon.

The nature of my invention consists in a rotary dasher, so constructed and adjusted to a square box within the center of the churn as to cause the cream, when revolving, to be dashed by centrifugal force against the sides of the square center box. This movement oft repeated makes butter.

To enable those skilled in the art to make and use my invention, I shall describe its construction and operation.

Figure 1:
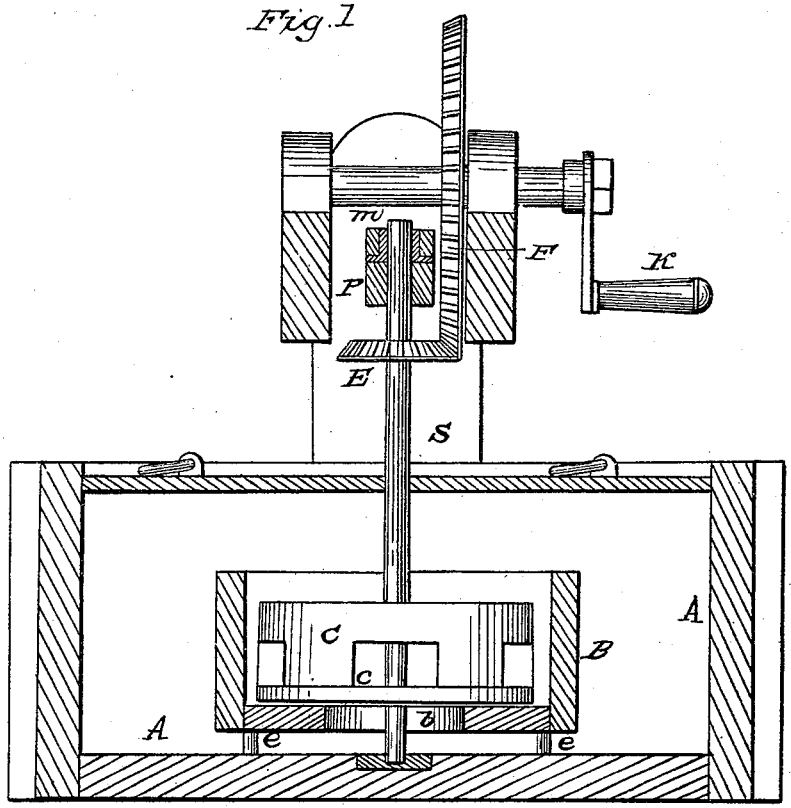
Figure 2:
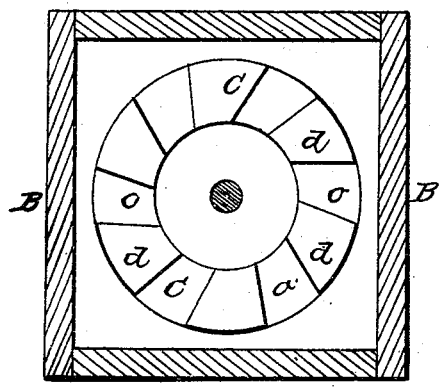

In the drawings, Figure 1 is a sectional view through the center of the churn and center box; also showing the general construction and operation. Fig. 2 is a plan view, showing the relative size of the center box and dasher; also the construction of the latter.

A is the body of the churn, square or any other suitable form. *a a* is the lid in two pieces; B, the center box, of a square or other desirable form, with its upper side entirely open. Its under side has a circular opening, *b*, corresponding in size to the opening *c* (shown in red lines in Fig. 1) in the under side of dasher C. The center box is sufficiently large to allow of the free play of the dasher C. There are three or more pins, *e e*, under box B, to raise it up a sufficient height to allow the cream flowing up through opening *b*.

C is the dasher, constructed by two disks of a suitable and of the same area, connected by blocks *d d d d d d* or other suitable means. These blocks are arranged so as to have an opening on each of their sides similar to those marked *o*, Fig. 2. They extend from the opening *c* to the dasher's outer edge. The dasher is firmly secured to shaft S, which has its lower bearing on the bottom of the churn and its upper in journal-box *m* in cross-bar P. Shaft S is propelled by means of power imparted to crank K through cogs F and E.

To operate my churn, the cream is poured into the churn until it is quite to the top of the center box, B. The cream will flow into the center box through the opening *b*. The lid *a a* is then put on and the crank K turned, causing the dasher C to rapidly revolve, which will, by means of the blocks *d* acting upon the cream within the openings *o* by centrifugal power, throw the cream against the sides of the center box, B, thereby causing a vacuum in the center of the dasher, which will be instantly filled by the cream at the bottom of the churn rushing through openings *b* and *c*. This quantity will be served as the first, and so on until the butter is formed.

It will thus be seen that as each portion is dashed against the sides of box B it will be forced by the next portion over the sides of said box onto the top of the cream, and will not be worked until the cream underneath has been worked, thus securing uniformity in the working of all the cream, and thereby producing more butter from the same quantity of milk than any churn now in use; and from the dasher agitating but a small quantity at a time, it requires but very little power, and from the construction the butter is produced much quicker. Such are the peculiar advantages of my invention.

Having thus fully described my invention, what I claim as new, and desire to secure by Letters Patent, is—

1. The rotary dasher C, constructed and operating substantially in the manner and for the purposes hereinbefore described.

2. The rotary dasher C, center box, B, and churn A, constructed and operating substantially in the manner and for the purposes hereinbefore described.

In testimony that I claim the above improvements in churns I hereunto sign my name.

ZACCHEUS B. SHANNON.

Witnesses:
 ADAM TIMERMAN,
 HENRY S. TIMERMAN.